Oct. 22, 1929.  G. A. McDONALD  1,732,762
COMPOSING STICK
Filed Oct. 10, 1927
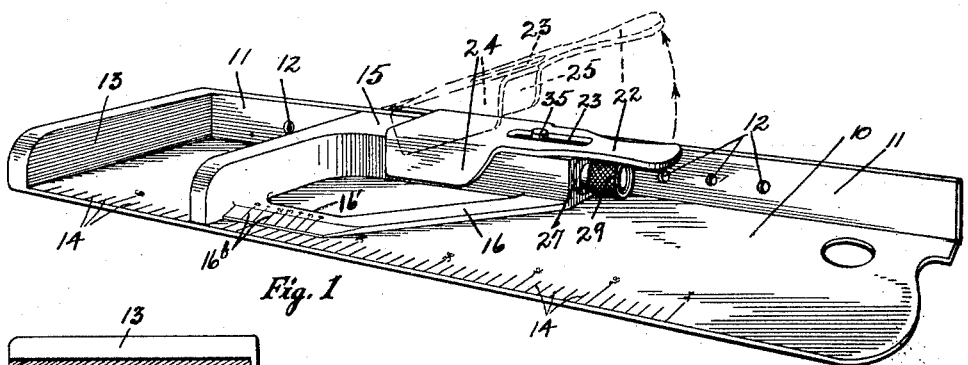
Fig. 1
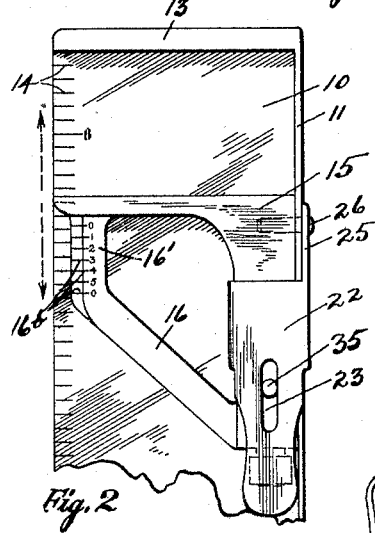
Fig. 2
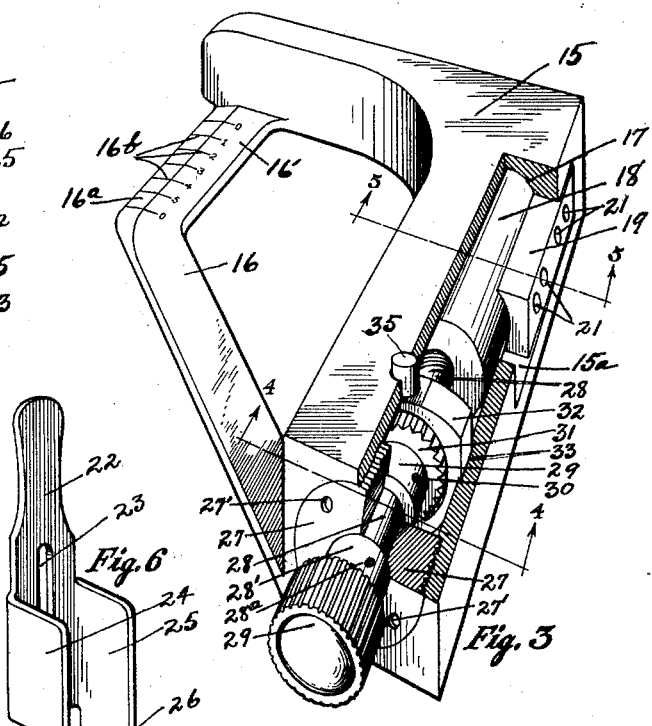
Fig. 3
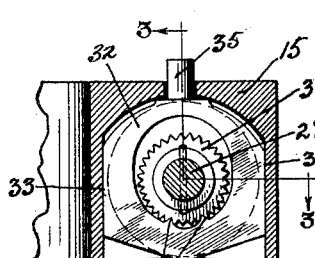
Fig. 4
Fig. 6
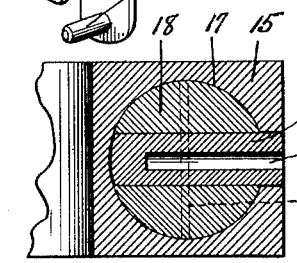
Fig. 5
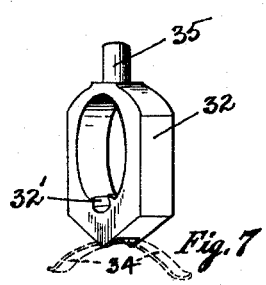
Fig. 7
INVENTOR.
George A. McDonald
BY
ATTORNEY.

Patented Oct. 22, 1929

1,732,762

UNITED STATES PATENT OFFICE

GEORGE A. McDONALD, OF PASADENA, CALIFORNIA

COMPOSING STICK

Application filed October 10, 1927. Serial No. 225,049.

Among the salient objects of my invention are: To provide an improved form of composing stick which can be quickly and rigidly set, not only to any nonpareil measure within the capacity of the stick, but to any desired number of intermediate points as well, without the use of slugs or quads; to provide improved locking mechanism for rigidly locking the adjustable knee in any adjusted position within its capacity; to provide a special knee with a cooperating scale bevel adjacent the scale on the stick, whereby said knee can be moved to the desired position, and then locked rigidly in that position by the simple adjustment of the locking mechanism provided as a part of my improved composing stick.

The principal units of measurement employed by printers are the point, the nonpareil and the pica, which are approximately 1/72, 1/12, and 1/6 of an inch, respectively.

In order to explain my invention, I have shown one practical embodiment thereof on the accompanying sheet of drawings, in which:

Figure 1 is a perspective view of a composing stick embodying my invention;

Figure 2 is a face view of the operating end thereof;

Figure 3 is an enlarged perspective view, partly in section on line 3—3 of Fig. 4, of the adjustable knee;

Figure 4 is a fragmentary cross sectional view thereof taken on line 4—4 of Fig. 3; with part 27 removed.

Figure 5 is a similar view taken on line 5—5 of Fig. 3;

Figure 6 is a perspective view of a clamping member or lock; and

Figure 7 is a perspective view of a spring pressed holding device.

Referring now more in detail to the drawings, the body of my composing stick, designated 10, is similar in form to those in common use, and has the side wall 11, with the holes 12 therethrough, the upper end wall 13, and the graduations 14, along its front edge, said graduations being spaced one nonpareil, approximately 1/12 of an inch apart. The holes 12, in the side wall 11, are spaced four nonpareils apart from center to center.

The knee comprises an angular body portion 15, with an angular portion 16, connecting the opposite ends of said body 15, said angular portion 16, having a straight part 16', with beveled edge 16ª, provided with graduation marks 16ᵇ, said graduations, in the embodiment of my invention here illustrated, form a scale on said knee along a space equal to five nonpareils, or thirty points, divided into six equal divisions of five points each. The scale on the bottom of the stick, it will be recalled, is provided with graduations one nonpareil, or six points, apart, which means that six spaces on the knee are equal to five spaces on the scale of the stick. Said scales are positioned in register with each other so that when the knee is moved along the bottom of the stick, the two scales are in convenient register with each other, as shown.

The knee body 15, is provided with a cylindrical bore 17, longitudinally thereof, in which is a snugly fitting cylindrical member 18, through which is inserted transversely, near its end, a rectangular member 19, secured in place by means of a pin 20, indicated in light broken lines in Fig. 5, and said rectangular member 19, is provided with four transverse holes, 21, which are in line with the holes 12, in the side wall 11, of said stick 10, the body of said knee being provided with an elongated opening 15ª for this purpose, as seen clearly in Fig. 3.

A clamping member 22, Fig. 6, has the body slot 23, the two side wings 24 and 25, the wing 25 being longer and provided with a pin 26, said pin being adapted to fit into any one of the holes 21, in said rectangular member 19, and said clamping member being adapted when in position, to close down over the body 15 of said knee, and the side wall 11, of said stick, in the manner clearly indicated in Figs. 1 and 2. The elongated opening 15ª is longer than the rectangular member 19, to permit longitudinal movement of said member 19, with said cylindrical member 18, in a manner to be described.

In the open end of the cylindrical bore, 17, in the knee body 15, is a threaded closure and bearing member 27, with wrench holes 27', in its outer face. Through said member 27, is an operating rod or shaft, 28, having threaded engagement at its inner end with said cylindrical member 18, and provided on its outer end with a nurled head or nut 29.

Mounted on said shaft 28, inside of the closure member 27, is a sleeve 29, secured in place, as by means of a set screw 30, and on this sleeve is a ratchet or toothed member 31. A yoke 32, is placed around said ratchet 31, and within the body of the knee, said body being provided with a straight, transverse slideway, as at 33, for said yoke, said yoke being provided in its lower side with teeth 32' adapted to mesh with the teeth of the ratchet 31, Fig. 4, when said yoke is in its raised position. A spring 34, is placed under said yoke to keep it normally raised in holding position and engagement with said ratchet. On its upper side, said yoke is provided with a pin 35, projecting through the top of said knee body 15, as shown, and adapted to project through the body slot 23, is the clamping member 22, when the latter is down in operating position, as shown in Figs. 1 and 2. On the shaft 28, between the knurled nut 29 and the bearing member 27, is a sleeve 28', held in adjusted position by means of a set screw 28ª, thus making it possible to prevent any lost movement longitudinally of said operating shaft 28, and making it possible to have accuracy of adjustments.

The use and operation of my invention as here illustrated may be briefly described as follows:

With the cylindrical member 18 and the transverse rectangular member 19, in the positions indicated and with the clamp 22 raised, as indicated in light broken lines in Fig. 1, said knee can be moved upon the stick 10 to any nonpareil measure or graduation within the capacity of the stick, that is, until its end wall face is in line with one of the graduations on the base of the stick. In order to move the knee thus, it would be necessary to remove the clamping member and then insert its pin 26 through the particular holes 12, in the wall 11, and 21, in the rectangular member 19, which are in register, and the clamping member 22 then closed down. If some intermediate measure is desired, the clamping member is raised to the position indicated in the light broken lines in Fig. 1, and the knurled hand nut 29, is turned to rotate the operating shaft 28, one way or the other, as desired, and this would cause said knee 15 to be moved in one direction or the other, as the case might be, for the reason that the cylinder 18 is held in its adjusted position by reason of the pin 26 of the clamping member through the wall 11 of the stick, and the rectangular transverse member 19, in said cylinder, as will be clear, said shaft being connected to said knee through the bearing member 27, and the sleeves 28' and 29. In Fig. 2, the knee is shown adjusted until the face thereof is beyond the eleventh graduation on the bottom of the stick and graduation 4 on the scale of the knee coincides with one of the graduations on the stick. Bearing in mind that the scale on the knee has its graduation marks one point closer together than those of the scale on the stick, it is apparent that adjusting the knee by turning the nurled nut 29 and the shaft, while depressing the pin 35, and its yoke 32, is a simple matter and it can be moved to any point adjustment.

Assuming that the lower graduation 0 on the knee is moved down into register with the next lower graduation on the stick 13 which graduation would be number 18, if numbered, the face of the knee then would be in register with graduation 11, the one shown in dotted lines. One point move of the knee downwardly would be indicated when its graduation 5, registers with 17. A two point move of the knee would be indicated when its graduation 4, registers with graduation 16, on the stick, as it is shown in said Fig. 2. A three point move of the knee would be indicated when its graduation 3, registers with graduation 15 of the stick. A four point move of the knee would be indicated when its graduation 2, registers with graduation 14 of the stick. A five point move of the knee would be indicated when its graduation 1, registers with graduation 13 of the stick, and a six point move of said knee upwardly would be indicated when its graduation 0 at the top, registers with graduation 12 of the stick. The knee, as adjusted in Fig. 2 is, therefore, moved two points intermediate nonpareils 10 and 11 on the stick. Thus this point adjustment of the knee can be made with the invention as shown and illustrated, and while I have shown and described one practical embodiment of the invention for descriptive purposes, I am aware that changes can be made in details without departing from the spirit thereof, and I do not, therefore, limit the invention to the showing made, except as I may be limited by the hereto appended claims.

I claim:

1. A composing stick for printers including in combination a stick proper having graduations thereon, a knee adjustably mounted therein and having graduations thereon to cooperate with the graduations on said stick proper in adjusting said knee to different positions, the graduations on said knee being different from the graduations on said stick, with six spaces on one equal to five spaces on the other, and means for adjusting and locking said knee in adjusted positions.

2. A composing stick for printers including in combination a stick proper having graduations thereon, a knee adjustable therein and having graduations to register with the graduations on said stick proper, a larger number of graduations on one covering the same space with a less number of graduations on the other, and mechanical means for adjusting and locking said knee in adjusted position.

3. A composing stick for printers including in combination a stick proper having graduations thereon, a knee adjustable therein and having differently spaced graduations to register with the graduations on said stick proper, a part on said knee being movable relative to the other part thereof, differently spaced holes in said part and in said stick for interlocking said part in different positions in said stick, a clamping member having a pin to be inserted through a hole in each when in register and means for adjusting and locking the knee proper relative to said part, whereby said knee can be adjusted to fractional portions of a graduation unit.

4. In a composing stick, a stick proper having bottom, end and side walls, a knee adjustable upon said bottom along said side wall, said knee having a body part having a cylindrical member therein adjustable relative to said body part longitudinally, said cylindrical member having means providing a plurality of holes and the side wall of said stick having holes therein, said holes being spaced to register one hole in the side wall and one hole in the cylindrical member to receive a pin, a clamping member having a pin adapted to be inserted through said registering holes, to lock said cylindrical member relative to said side wall, and screw means for adjusting the knee proper relative to said cylindrical member.

5. In a composing stick, a stick proper and a knee adjustable thereon, and means for adjusting said knee relative to said stick proper, said means including holes in said stick and holes in a part of said knee adapted to be moved into register, a clamping member having a pivot pin adapted to be inserted through a hole in each when in register, said clamping means being adapted to be moved on said pivot pin into clamping position over parts of said stick proper and said knee, screw means for adjusting the knee proper relative to the part having the holes therein, and yielding locking means for holding said screw means in adjusted positions.

6. In a composing stick, a stick proper having a side wall longitudinally thereof, a knee having a body portion slidably along said side wall, a part in said knee body adjustable therein longitudinally thereof and having holes opening on the inside of said side wall, said side wall having corresponding holes, a pivot pin with clamping member thereon for interlocking said knee and side wall in various positions of adjustment, screw means in said knee body for adjusting said knee relative to the part therein having the holes in, and spring held, releasable means for locking said screw means in adjusted positions, whereby to take up lost motion and adjust said knee relative to said stick proper to points intermediate nonpareil graduations.

7. In a composing stick, a stick proper having side and end walls, a knee adjustable therein along said side wall, said knee having a body sliding flatwise along the inside of said side wall, a cylindrical member adjustable longitudinally within said knee body, a member transversely seated in said cylindrical member with its face flush with the face of said knee body and flatwise contiguous to said side wall, said member and said side wall having holes to be moved to register with each other, means for adjusting said knee body longitudinally relative to said cylindrical member and said transverse member, and clamping means having a pin adapted to be inserted through registering holes for interlocking said parts to said stick side wall.

Signed at Pasadena, Los Angeles County, California, this 3rd day of October, 1927.

GEORGE A. McDONALD.